(12) United States Patent
Bi et al.

(10) Patent No.: US 8,665,801 B2
(45) Date of Patent: Mar. 4, 2014

(54) ALLOCATING FORWARD LINK RESOURCES FOR TRANSMITTING DATA OVER A SHARED FORWARD LINK DATA CHANNEL WITHOUT ALLOCATING REVERSE LINK RESOURCES FOR REVERSE LINK DATA TRANSMISSION

(75) Inventors: Qi Bi, Morris Plains, NJ (US); Stan Vitebsky, Morristown, NJ (US); Yang Yang, Morris Plains, NJ (US)

(73) Assignee: Alcatel Lucent, Paris (FR)

(*) Notice: Subject to any disclaimer, the term of this patent is extended or adjusted under 35 U.S.C. 154(b) by 898 days.

(21) Appl. No.: 12/007,206

(22) Filed: Jan. 8, 2008

(65) Prior Publication Data

US 2009/0175225 A1  Jul. 9, 2009

(51) Int. Cl.
*H04W 72/04* (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

| | | | |
|---|---|---|---|
| 6,958,989 B1* | 10/2005 | Dick et al. | 370/342 |
| 2004/0162083 A1* | 8/2004 | Chen et al. | 455/454 |
| 2008/0311919 A1* | 12/2008 | Whinnett et al. | 455/447 |
| 2009/0046672 A1* | 2/2009 | Malladi et al. | 370/336 |
| 2009/0196239 A1* | 8/2009 | Lee et al. | 370/329 |
| 2010/0208667 A1* | 8/2010 | Chun et al. | 370/329 |

FOREIGN PATENT DOCUMENTS

| | | |
|---|---|---|
| JP | 2007-503156 A | 2/2007 |
| WO | WO 2004/075468 | 9/2004 |
| WO | WO 2007/107089 | 9/2007 |

OTHER PUBLICATIONS

Anthony C.K. Soong et al., "Forward High-Speed Wireless Packet Data Service in IS-2000—1xEV-DV," IEEE Communications Magazine, pp. 170-177, Aug. 2003.
Ian Poole, "Cellular Communications Explained From Basics to 3G," Elsevier, 2006, XP040426001.
3GPP2: "Upper Layer (Layer 3) Signaling Standard for cdma2000 Spread Spectrum Systems," 3GPP2-Drafts, May 28, 2002, XP040269373.
International Search Report and Written Opinion dated Jul. 16, 2009.
International Preliminary Examination Report mailed Jul. 22, 2010.
Office Action mailed Nov. 6, 2012 in Japanese Patent Application No. 2010-542206 and English language translation of the same.

* cited by examiner

*Primary Examiner* — Sulaiman Nooristany
(74) *Attorney, Agent, or Firm* — Harness, Dickey & Pierce (57) ABSTRACT

In one embodiment the method includes allocating, for a mobile, forward link resources for transmitting data over a shared forward link data channel without allocating reverse link resources for reverse link data transmission in association with the allocated forward link resources. At least a portion of the received data is repeatedly sent to the mobile on the shared forward link data channel over a time division multiple access air interface using the allocated forward link resources until an acknowledgement is received from the mobile or a number of transmissions have taken place.

6 Claims, 5 Drawing Sheets

ALLOCATING FORWARD LINK RESOURCES FOR TRANSMITTING DATA OVER A SHARED FORWARD LINK DATA CHANNEL WITHOUT ALLOCATING REVERSE LINK RESOURCES FOR REVERSE LINK DATA TRANSMISSION

BACKGROUND

High Rate Packet Data (HRPD) standard (aka EV-DO), as well as other recently defined high-speed wireless data technologies, were designed to maximize the air interface transmission efficiency for a small number of active users with heavy data volume transactions. The technology employs multiple overhead/feedback channels to optimize the traffic channel performance.

However, as the HRPD Rev.0/RevA system deployment continues, it has been observed that the traffic pattern significantly deviates from the above assumptions. That is, most of the data applications that prevail in wireless networks have short data bursts and quite long inter-burst intervals, such as generated by short message services, rich presence applications, etc. This pattern is further magnified by the emergence of applications with automated communication between a wireless device and the network. These applications often do not require end-user intervention and are based on an "always-on" concept involving intermittent messaging, such as application status notifications and keep-alive messages.

These application may be referred to as "chatty applications", meaning that the applications frequently access the network, but each access only generates a small amount of data traffic.

With chatty applications dominating the wireless markets, the achieved air interface HRPD performance is severely degraded due to a mismatch with the original design philosophy. Instead of a small number of users accessing the network at a time, many more users are seen trying to access the network. This significantly increases the access channel loading and causes high RF interference on the reverse link due to access channel overload. Instead of a small number of active users maintaining their RF connections, the network opens a large number of connections, causing connection overflow and call blocking. In addition, since each connection maintains associated overhead/feedback channels, this creates a high RF resource usage just to support those overhead channels. Still further, instead of large data volumes that take advantage of efficient air transmission, each chatty application connection only generates a small amount of data, and does so intermittently, for the lifetime of the connection. Namely, the connection remains idle most of the time. This makes the connection utilization very low.

SUMMARY

The present invention is directed to a method of wireless data transmission.

At least one embodiment provides flexible and short packet transmissions without constant fixed overhead, and/or may avoid the long delay caused by the lengthy connection setup process.

For example, in one embodiment the method includes allocating, for a mobile, forward link resources for transmitting data over a shared forward link data channel without allocating reverse link resources for reverse link data transmission in association with the allocated forward link resources. At least a portion of the received data is repeatedly sent to the mobile on the shared forward link data channel over a time division multiple access air interface using the allocated forward link resources until an acknowledgement is received from the mobile or a number of transmissions have taken place.

In another embodiment, the method includes receiving a data alert message on a reverse link access channel indicating a mobile has data for transmission. In response to the received data alert message, a network element allocates, for the mobile, reverse link resources for receiving data over a shared reverse link data channel without allocating forward link resources for forward link data transmission in association with the allocated reverse link resources. At least a portion of the data is repeatedly received on the reverse link data channel based on the allocated reverse link resources until the data is successfully decoded, and an acknowledgement of the received data is sent on a forward link channel if the received data is successfully decoded.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile" may be considered synonymous to, and may hereafter be occasionally referred to, as a mobile unit, mobile station, mobile user, user equipment (UE), subscriber, user, remote station, access terminal (AT), receiver, etc., and may describe a remote user of wireless resources in a wireless communication network. The term "base station" may be considered synonymous to and/or referred to as a base transceiver station (BTS), base station, NodeB, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

Figure 1:
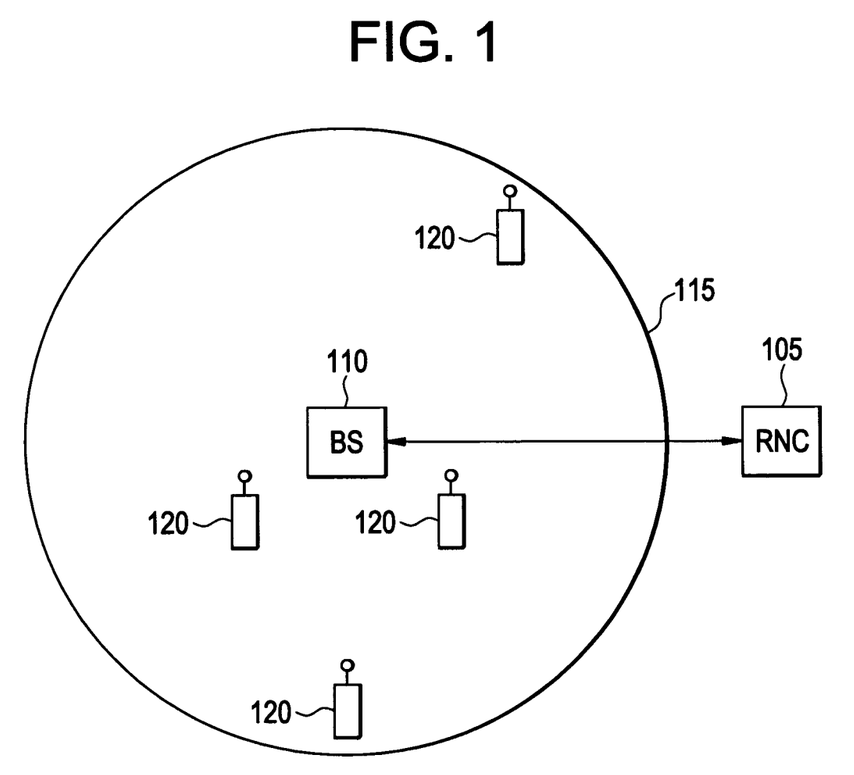
FIG. 1 illustrates a portion of a wireless communication system.

FIG. 1 illustrates a portion of a wireless communication network or system 100 according to an embodiment of the present invention. As shown, the wireless communications system 100 includes a radio network controller (RNC) 105 communicatively coupled to one or more base stations 110. For the sake of clarity, only a single base station 110 is shown. The RNC 105 may be communicatively coupled to the one or more base stations 110 by any of a variety of wired and/or wireless links. Signals passed between the RNC 105 and the one or more base stations 110 may pass through one or more other devices (not shown), such as, routers, switches, networks or the like. Collectively, the RNC 105, the base stations 110 and other devices are often referred to as the wireless network or system 100.

Each base station 110 is associated with at least one cell 115. Each cell 115 corresponds to a geographic area having a given radius. A plurality of mobiles 120 may be located in the cell 115 at any one time. As is well-known with respect to, for example, HRPD RevA, the mobiles 120 monitor a forward link control channel (F-CC) for pages and overhead messaging, and initiate communication and send responses over a reverse link enhanced access channel (R-EAC).

According to an embodiment of the present invention, each base station 110 provides the following new types of air interface channels for data transmission: a reservation based shared forward link data channel (F-RSDC) and a reservation based shared reverse link data channel (R-RSDC). Several other companion channels are provided as well, together with some new over-the-air signaling messages to operate the channels, and these channels and messages will be described in detail below.

The forward link and reverse link shared data channels may be used by multiple users instead of dedicated to a single user. The shared data channels may have a packet transmission slot timing structure, and the system 100 may employ any well-known scheduling algorithm to determine which user can receive their packets in the next available packet transmission slot on the F-RSDC or transmit their packets in the next available packet transmission slot on the R-RSDC. The packet transmission process may use similar rules as that on the traffic channel to improve the RF transmission efficiency and to ease implementation through compatibility and interworking with network and mobile devices based on the previous revisions of, for example, the HRPD standard.

On the forward link, the reservation based shared data channel (F-RSDC) has the identical physical channel structure as and is time-multiplexed with the current and well-known forward traffic channel (FTC); but operates using allocated medium access control (MAC) indices reserved only for the F-RSDC, and may carry data for more than one mobile. For example, there may be multiple MAC indices associated with the F-RSDC to meet expected capacity. The packet transmission on F-RSDC goes through the well-known HARQ process, where a mobile 120 sends up acknowledgements (ACKs) or non-acknowledgements (NACKs) on a newly provided companion channel—the reverse shared acknowledgment channel (R-SACK).

Figure 2:
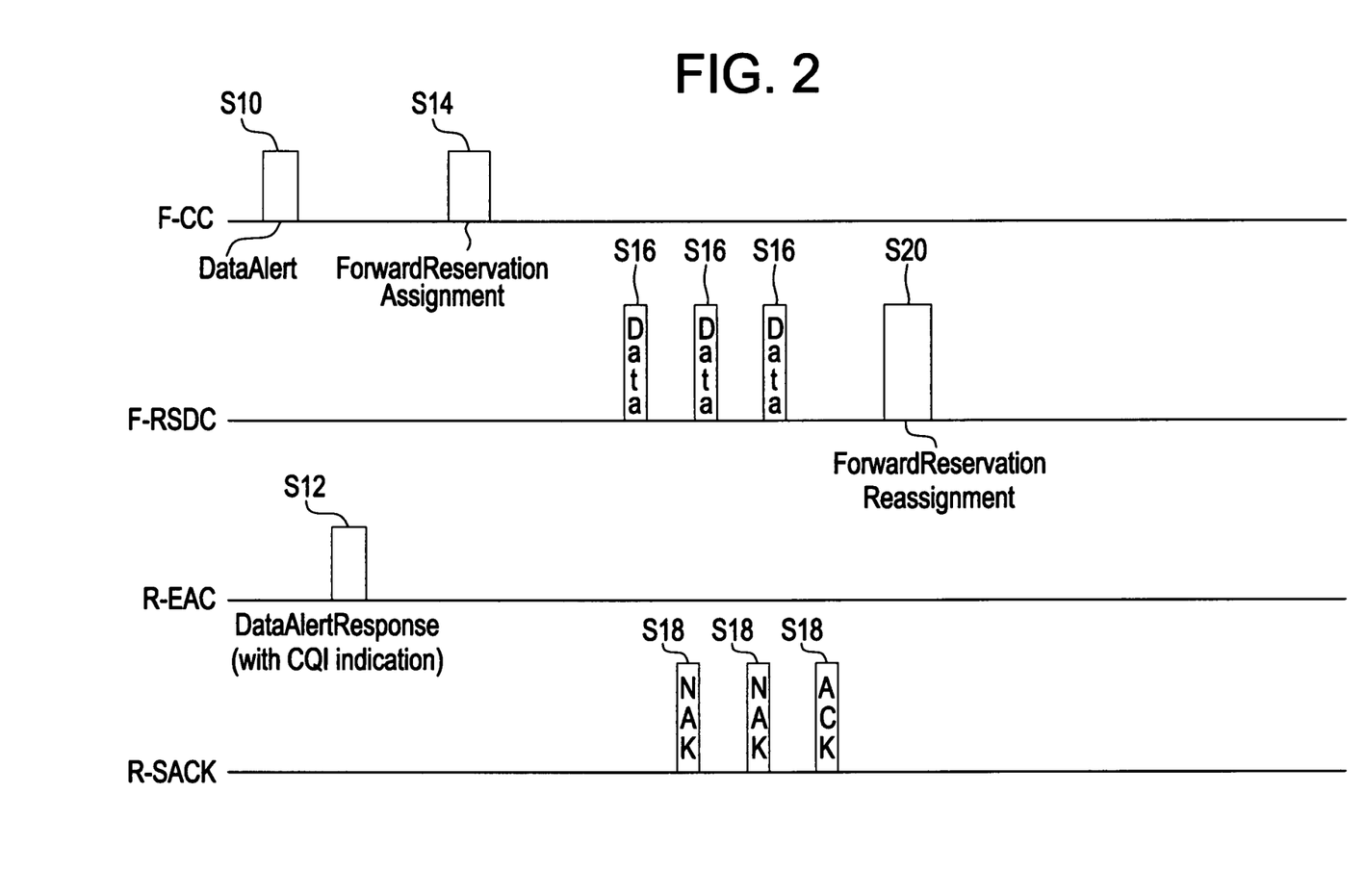
FIG. 2 illustrates the communication over the involved channels in performing the method of forward link data transmission to a mobile according to an embodiment of the present invention.

The operation of data transmission using the F-RSDC will now be described with respect to FIG. 2. FIG. 2 illustrates the communication over the involved channels in performing the method of forward link data transmission to a mobile according to an embodiment of the present invention. This method will be described as implemented by the wireless communication network of FIG. 1, but it will be understood that the present invention is not limited in application to this network.

As shown, if the network 100 wants to transmit a short amount of data to a user, the base stations 110 first try to locate the user by sending out a data alert message over the existing forward link control channel in step S10. As is well-known, a synchronous control channel is used in HRPD to transmit to an idle user with a known wake up cycle.

If the user's mobile 120 is located in the cell 115 of a base station 110 transmitting the data alert message, the mobile 120 responds by sending a data alert response on the existing enhanced access channel (R-EAC) as shown by step S12. The data alert response message includes the forward link RF condition observed by the mobile 120. For example, the forward link RF condition may be the ChannelQualityIndication (CQI) field and may be used by the base station 110 to determine the forward link data transmission rate.

In step S14, the base station 110 allocates, for the mobile, forward link resources for transmitting over a shared forward link data channel without allocating reverse link resources for reverse link data transmission in association with the allocated forward link resources. For example, the base station 110 does not need to provide separate receiver resources, etc. for receiving data transmissions from the mobile 120, which normally takes place if a data connection is established between the base station 110 and the mobile 120. As such, the data transmission in this embodiment may be thought of as connectionless. Complementary to this, and as will be appreciated below, while the mobile 120 provide resources for receiving data on the forward link, the mobile does not need to provide resources for transmitting data on the reverse link in association with the resources allocated to the forward link. As part of the resource allocation, the base station 110 chooses an available one (i.e., unassigned one) of the MAC indices reserved only for the F-RSDC, and sends a forward reservation assignment message over the existing (asynchronous) forward link control channel. Namely, the forward reservation assignment message indicates the selected or assigned MAC index for the mobile. A data rate may be sent in association with the MAC index. The data rate indicates the data rate at which the data will be sent to the mobile 120 over the F-RSDC. The data rate may be, for example, choosen from one of the FTC RevA data rates, and the choosen data rate may be selected using any well-known methodology based on the CQI information provided with the data alert response from the mobile 120. The F-RSDC transmission may use the HARQ scheme defined for existing HRPD FTC. Namely, the base station 110 repeatedly sends at least a portion of the data to the mobile 120 on the shared forward link data channel over a time division multiple access air interface until an acknowledgement is received from the mobile 120 or a number of transmissions have taken place. As will be recalled from the above, the F-RSDC may be time multiplexed with one or more FTC.

The mobile 120 monitors the F-RSDC for the specified MAC index using the assigned or implied (by CQI) data rate and tries to decode the data sent over the F-RSDC in step S16. For example, the base station 110 may send the data using the assigned MAC index as a preamble or as a portion of a preamble. The mobile 120 transmits on R-SACK accordingly to indicate the packet decoding status in step S18 to facilitate HARQ operation. Namely, if the packet is decoded properly, the mobile 120 sends an acknowledgement (ACK); and if the packet is not decoded properly, the mobile 120 sends a non-acknowledgement (NACK). As shown in FIG. 2, in this example, the mobile 120 sends a NACK in response to the first two HARQ transmissions of a packet from the base station 110, and then sends an ACK. The timing of ACK/NAK transmissions on the R-SACK channel is at a set offset from the corresponding F-RSDC transmission defined in the same manner as the timing of existing HRPD R-ACK relative to the FTC. The initial ACK/NAK transmission on R-SACK from a given mobile may be preceeded by an acquisition preamble.

The base station 110 may remove the MAC index assigned to the mobile 120 by sending a forward reservation deassignment message over the corresponding F-RSDC channel in step S20. This message is sent using the assigned MAC index and at the assigned data rate. The mobile 120 keeps monitoring the F-RSDC until the mobile 120 receives the deassignment message.

If the base station 110 receives data for transmission to more than one mobile in cell 115, the base station 110 follows the above process with respect to each mobile such that different MAC indices are assigned to each mobile. The data for each mobile is sent in different time slots, and identified by the respective mobiles based on the assigned MAC indices. Unlike with a traffic channel, the mobiles receiving data in the forward link direction on the F-RSDC do not need to have a reverse channel for data transmission concurrently assigned to them.

On the reverse link, the reservation based shared data channel (R-RSDC) uses an access scrambling code reserved for R-RSDC. Multiple access codes may be defined to meet the capacity need. The packet transmission over R-RSDC goes through a HARQ process as with the existing HRPD reverse traffic channel (RTC). The first time transmission is composed of a preamble to facilitate the packet detection, followed by the data, pilot and rate indication parts. The subsequent HARQ transmissions of the same packet are composed of the pilot part, the data part and optionally the rate indication part. The base station 110 provides acknowledgments on a forward shared ACK channel (F-SACK) associated with the R-RSDC, which is code- and time-multiplexed with other existing HRPD forward link MAC channels in the same manner as existing HRPD F-ACK channel. It is also feasible for the mobile 120 to indicate that the mobile 120 has "more data" to transmit using a separate preamble code on the R-RSDC. Unlike with a traffic channel, the mobiles sending data on the reverse link direction over the R-RSDC do not need to have a forward channel for data transmission concurrently assigned to them. Namely, the mobile allocates reverse link resources for transmitting over the shared reverse link data channel without allocating forward link resources for forward link data transmission in association with the allocated reverse link resources. As such, the data transmission in this embodiment may be thought of as connectionless. Complementary to this, and as will be appreciated below, while the base station 110 provides resources for receiving data on the reverse link shared data channel, the base station 110 does not need to provide resources for transmitting data on the forward link in association with the allocated reverse link resources.

Figure 3:
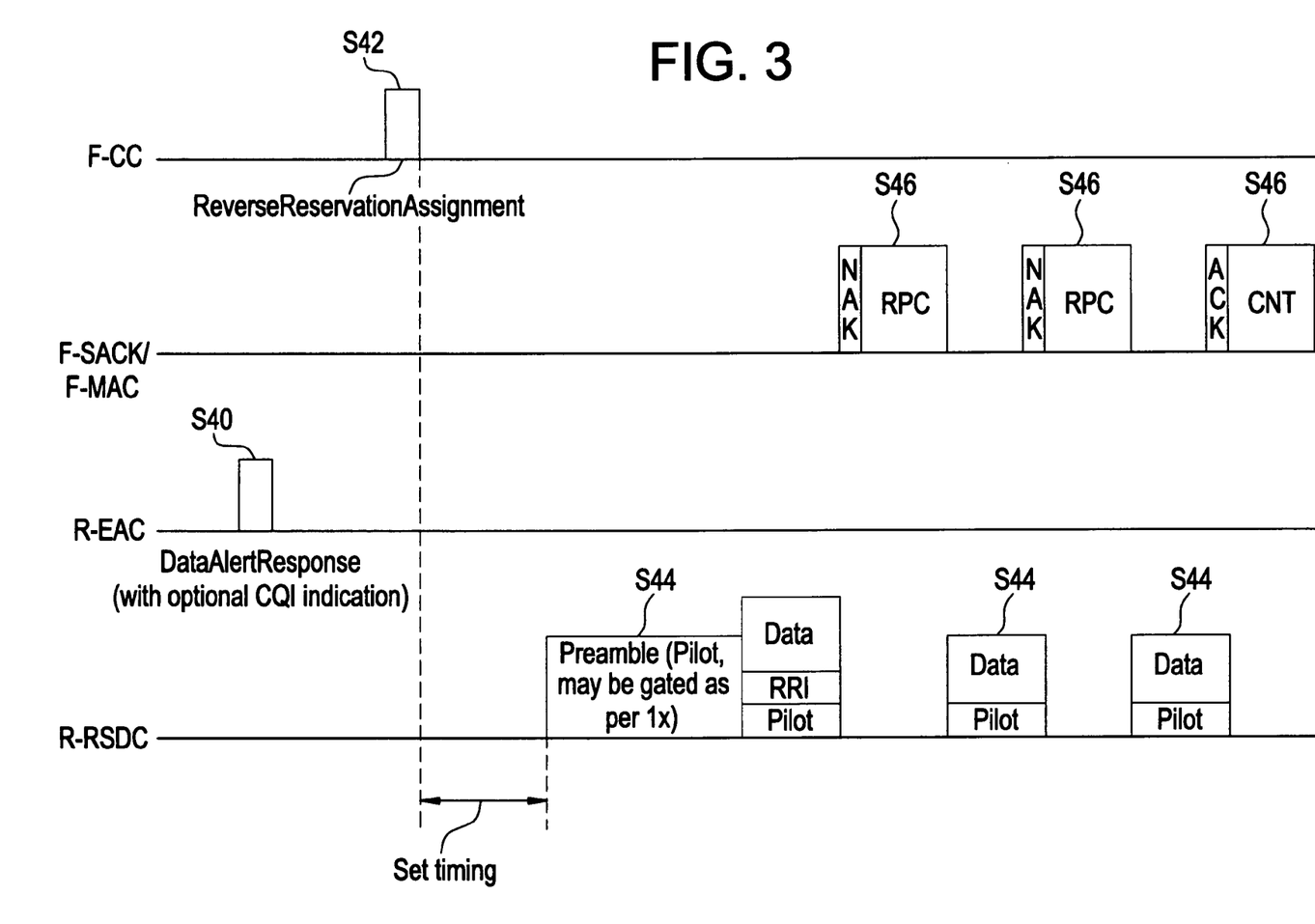
FIG. 3 illustrates the communication over the involved channels in performing the method of reverse link data transmission from a mobile according to an embodiment of the present invention.

The operation of data transmission using the R-RSDC will now be described with respect to FIG. 3. FIG. 3 illustrates the communication over the involved channels in performing the method of reverse link data transmission from a mobile according to an embodiment of the present invention. This method will be described as implemented by the wireless telecommunication network of FIG. 1, but it will be understood that the present invention is not limited in application to this network.

As shown, if the mobile 120 wants to transmit a small amount of data, the mobile 120 sends a data alert message over the enhanced access channel (R-EAC) in step S40. The data alert message may also include the ChannelQualityIndication (CQI) field.

The base station 110 responds by allocating resources for receiving data traffic on the reverse link without allocating resources for transmitting data on the forward link in association with the allocated reverse link resources in step S42. Part of this allocation includes choosing an available MAC index from a pool of available MAC indices reserved only for the R-RSDC, and sending a reverse reservation assignment message to the mobile 120 on the forward link control channel (F-CC). This message includes the selected MAC index. The base station 110 and the mobile 120 both map the assigned MAC index to an access scrambling code (e.g., a long code). Any well-known mapping technique may be used for this purpose. The message may also indicate the number of HARQ interlaces allocated for transmission on the R-RSDC.

In step S44, the mobile 120 receives the reverse reservation assignment message and allocates resources for transmitting data on the reverse link shared data channel without allocating resources related to data transmission from the base station on the forward link in association with the allocated reverse link resources. In step S44, the mobile 120 also determines the access scrambling code, and starts data transmission over the assigned R-RSDC at a set timing from receipt of the reverse reservation assignment message using the determined access scrambling code. The first time transmission is composed of a preamble to facilitate the packet detection, followed by the data, pilot and rate indication (e.g., the well-known RRI) parts. The subsequent HARQ transmissions of the same packet are composed of the pilot part, the data part and optionally the rate indication part. The subsequent HARQ transmission take place at a fixed interlaced timing from the previous HARQ transmission.

The base station 110 provides acknowledgments on a forward shared ACK channel (F-SACK) associated with the R-RSDC in step S46. Namely, the base station 110 responds to R-RSDC HARQ transmissions with ACK/NAK indications sent on the existing forward link MAC channel. The MAC channel transmissions may use orthogonal codes that are uniquely associated with the R-RSDC, on which the data was transmitted.

The base station 110 may also send well-known power control commands (RPC up/down commands) with the ACK/NACK transmissions on the existing forward MAC channel to provide close loop power control feedback to the mobile 120 transmitting on the R-RSDC. As shown in FIG. 3, in this example, the base station 110 sends a NACK in response to the first two transmissions from the mobile 120, and then sends an ACK.

The base station 110 may remove the MAC index assignment, and therefore, the access scrambling code assignment, to the mobile 120 by sending a reverse reservation deassignment message over the forward link control channel. As shown in FIG. 3, the base station 110 may maintain the assignment by sending a continuation (CNT) message with an ACK on the forward MAC channel. Accordingly, in one embodiment, the base station 110 may remove the MAC index assignment by sending no continuation message on the MAC channel corresponding to the last HARQ packet transmission. Namely, in this embodiment, the mobile 120 may transmit over the assigned R-RSDC channel until the mobile 120 fails to receive the continuation indication. It will be appreciated that either or both of these deassignment methodologies may be used.

The mapping of the MAC indices to access scrambling codes may be established such that more than one MAC index maps to the same scrambling code. However, not all MAC indices need to map to the same scrambling code, and in this instance, it will be appreciated that more than one reverse link RSDC may exist. Furthermore, because of the timing relationship between the first data transmission by the mobile with respect to receipt of the reverse reservation assignment as well as the timing relationship between subsequent data transmissions and previous data transmissions, the base station 110 may schedule more than one mobile on the same R-RSDC by causing their respective transmissions to interlace. As will be appreciated, this scheduling is achieved by controlling when the respective reverse reservation assignment messages are sent to each mobile. Therefore, unlike a traffic channel, the R-RSDC may carry data from more than one mobile. Also, multiple interlaces on the same R-RSDC may be assigned to one mobile using one reservation assignment message. Accordingly, the reservation assignment message may have an explicit or implicit format to signal the number of assigned R-RSDC interlaces.

Next additional alternative embodiments or variations on the above-described embodiments will be described. The variations and alternatives will be described with respect to the wireless communication network of FIG. 1, but it will be understood that the present invention is not limited in application to this network.

Figure 4:
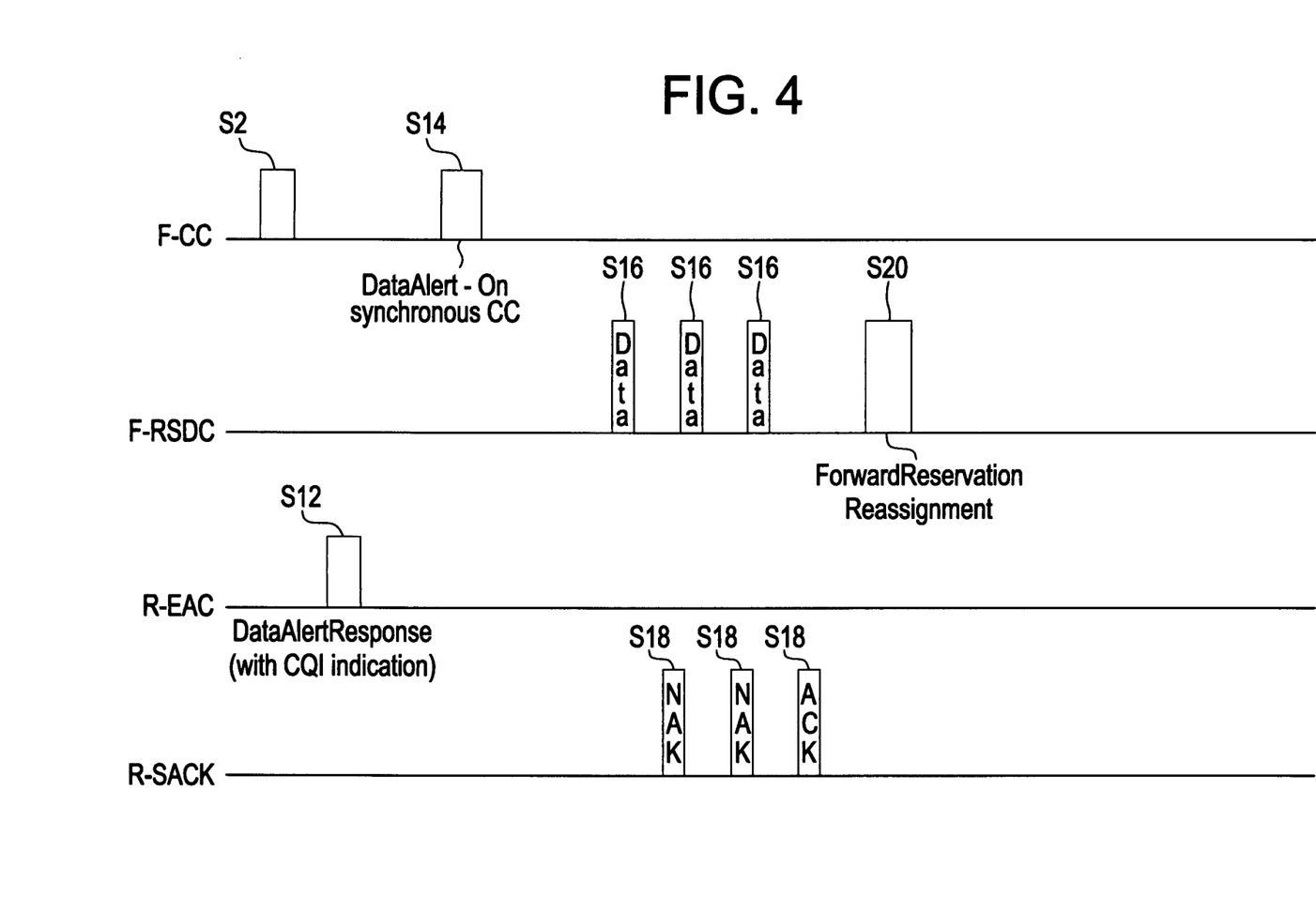
FIG. 4 illustrates the communication over the involved channels in performing the method of forward link data transmission to a mobile according to another embodiment of the present invention.

FIG. 4 illustrates the communication over the involved channels in performing the method of forward link data transmission to a mobile according to another embodiment of the present invention. As shown, the base station 110 broadcasts currently available MAC indices for the F-RSDC on the forward control channel to indicate availability of the resources and decrease collisions in step S2. If the network 100 wants to transmit a short amount of data to a user, the base stations 110 first tries to locate the user by sending out a data alert message over the existing forward link control channel in step S10.

If the user's mobile 120 is located in the cell 115 of a base station 110 transmitting the data alert message, the mobile 120 responds by sending a data alert response on the existing enhanced access channel (R-EAC) as shown by step S12'. The data alert response message includes the forward link RF condition observed by the mobile 120 and a proposed or selected one of the available MAC indices broadcast by the base station 110. The forward link RF condition may be the ChannelQualityIndication (CQI) field and may be used by the base station 110 to determine the forward link data transmission rate.

Because the mobile 120 selects the MAC index, sending a forward reservation assignment message as in step S14 of FIG. 2 is not required. Instead, communication may proceed as described above with respect to step S14 in FIG. 2, except for sending the forward reservation assignment message, and then the method further proceeds as discussed above with respect to steps S16-S20 in FIG. 2 using the MAC index selected by the mobile 120 and a default data rate or a predefined data rate. If the MAC index selected by the mobile 120 is no longer available, the base station 110 resends the data alert message.

Figure 5:
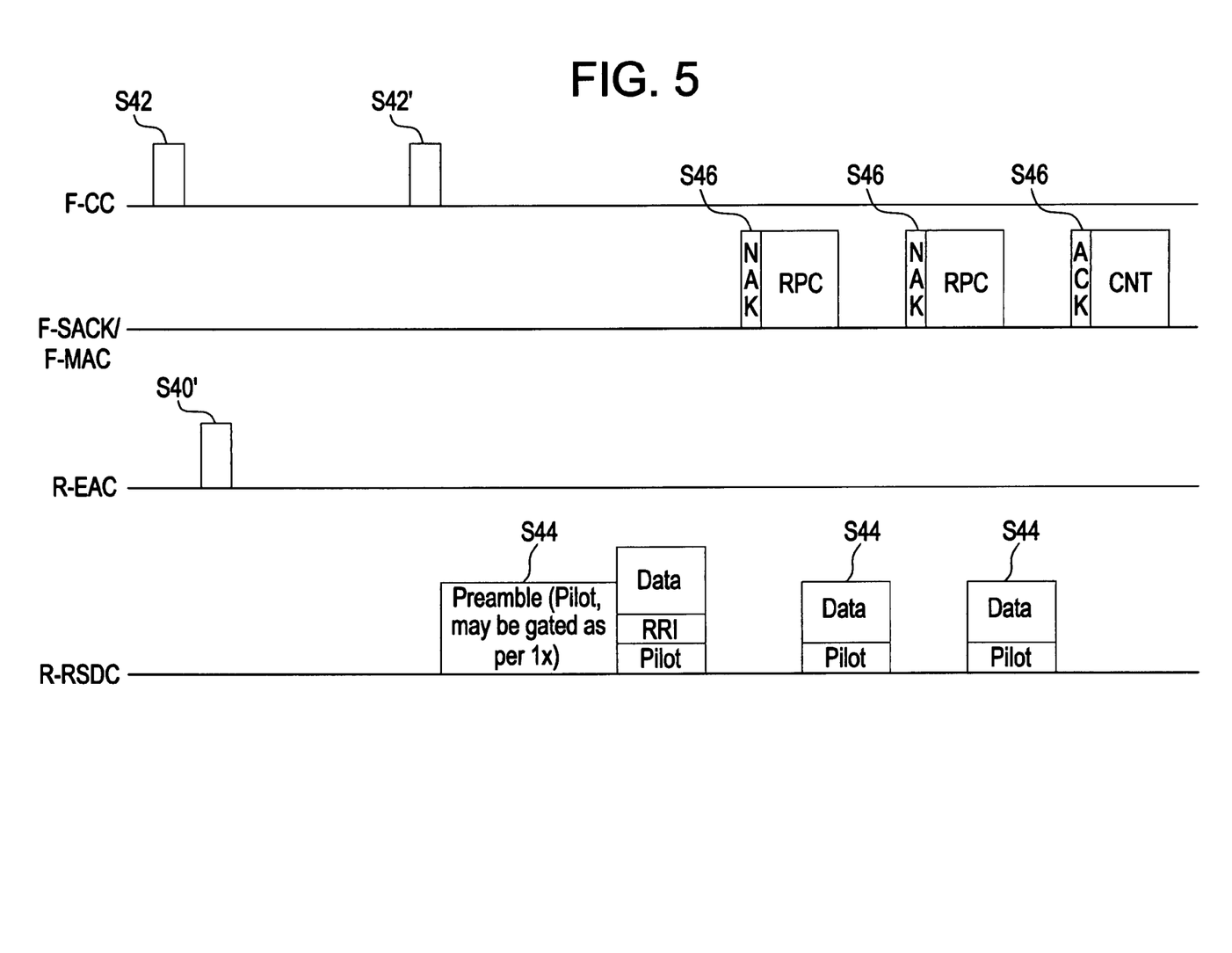
FIG. 5 illustrates the communication over the involved channels in performing the method of reverse link data transmission from a mobile according to another embodiment of the present invention.

FIG. 5 illustrates the communication over the involved channels in performing the method of reverse link data transmission from a mobile according to another embodiment of the present invention. As shown, the base station 110 broadcasts currently available MAC indices for the R-RSDC on the forward control channel to indicate availability of the resources and decrease collisions in step S38.

If the mobile 120 wants to transmit a small amount of data, the mobile 120 selects one of the available MAC indices and sends a data alert message over the enhanced access channel (R-EAC) in step S40'. The data alert message includes the selected MAC index and may also include the ChannelQualityIndication (CQI) field.

Because the mobile 120 selects and sends the MAC index, the base station 110 does not need to send the MAC index in the reverse reservation assignment message to the mobile 120 as in FIG. 3. Accordingly, step S42' may be the same as step S42 described above with respect to FIG. 3, or alternatively, may differ in that the reverse reservation message does not include the selected MAC index. The base station 110 and the mobile 120 both map the assigned MAC index to an access scrambling code (e.g., a long code), and communication proceeds as in FIG. 3.

With respect to FIGS. 4 and 5, the base station 110 may respond to the selected MAC index transmission from the mobile 120 using the well-known access channel ACK (AcACK) message.

Alternatively, the base station 110 may send the forward and/or reverse reservation assignment message as discussed above with respect to FIGS. 2/3 to confirm the selection made by the mobile 120. With respect to FIG. 4, the forward reservation assignment message may also indicate the data rate at which the mobile 120 should monitor the F-RSDC for data transmissions. With respect to FIG. 5, the reverse reservation assignment message may be used to schedule transmission by the mobile 120 in the same manner as described above with respect to FIG. 3.

Additional, alternatives and variations on the above described embodiment will now be discussed. In one embodiment, the mobile 120 may include well-known Connection Request (CRM) and Route Update (RUM) messages in the same access channel transmission together with the data alert response (FIGS. 2 and 4) and/or the data alert messages (FIGS. 3 and 5) to optionally request a connection resource allocation to accompany or to follow the RSDC transmission.

In another embodiment, the mobile 120 does not send the ACKs on the R-SACK channel as in FIGS. 2 and 4.

In yet another embodiment, use of the forward reservation deassignment message is eliminated. Instead, the reservation may be kept only for a single packet transmission or for a number of packets specified in the assignment message. Also the assignment may be maintained for another packet transmission if the mobile 120 has sent a NAK for a previous packet or if the base station 110 issued a continuation via another assignment message. Reverse reservation may also be continued for another packet if the "CNT" indication is sent at the end of the previous packet transmission.

Still further, while the embodiments have been described as being performed at the base station, it will be understood that on the network side, the embodiments may be performed by a different network element such as the RNC.

The embodiments may facilitate fast transition between connectionless and connection-oriented modes of operation by allocating network connection resources without actually assigning air interface traffic channels to the mobile unless certain criteria indicating non-chatty type of applications are met (e.g. backlog, QoS flow type, etc.). A connection mode is one in which a dedicated channel such as a traffic channel is established for two-way communication of data between the mobile and the base station. If the traffic channels should be established, the base station may send a TCA (traffic channel assignment) message to the mobile. Since at least a portion of the resources have been allocated in the connectionless mode according to the above embodiments, the transition to the connected state can be performed quickly. Similarly, a traffic channel can be deassigned without releasing all connection resources to allow the mobile to use the RSDC connectionless mode of transmission for chatty traffic, while anticipating a future possibility of transitioning back to the connected state.

The invention being thus described, it will be obvious that the same may be varied in many ways. Such variations are not to be regarded as a departure from the invention, and all such modifications are intended to be included within the scope of the invention.

We claim:

1. A method of wireless data transmission, comprising:
broadcasting available identifiers from a plurality of identifiers reserved for only a shared reverse link data channel;

receiving a data alert message on a reverse link access channel indicating a mobile station has data for transmission, the data alert message including a selected one of the available identifiers;

selecting an identifier from a plurality of identifiers reserved for only the shared reverse link data channel;

sending an assignment message including the selected identifier to the mobile station over a forward link control channel prior to the receiving the data, a timing of when the assignment message is sent establishing when the mobile station will send the data;

allocating, in response to the received data alert message, reverse link resources for receiving data over a shared reverse link data channel without allocating forward link resources for forward link data transmission in association with the allocated reverse link resources;

repeatedly receiving at least a part of the data on the reverse link data channel based on the allocated reverse link resources until the data is successfully decoded; and sending an acknowledgement of the received data on a forward link channel if the received data is successfully decoded.

2. The method of claim 1, wherein the receiving the data derives a scrambling code based on the selected identifier, and receives the data on the reverse link data channel using the derived scrambling code.

3. The method of claim 1, wherein the data alert message includes a channel quality indication field.

4. The method of claim 1, wherein the selected one of the available identifiers is a medium access control index, and a base station responds to the selected medium access control index from the mobile station using one of an access channel acknowledgement message and a reverse reservation assignment message to confirm the selection made by the mobile station.

5. A base station for providing at least one of data and voice connectivity between a network and one or more users, the base station comprising:

a controller configured to,
broadcast available identifiers from a plurality of identifiers reserved for only a shared reverse link data channel, receive a data alert message on a reverse link access channel indicating a mobile station has data for transmission, the data alert message including a selected one of the available identifiers, select an identifier from a plurality of identifiers reserved for only the shared reverse link data channel, send an assignment message including the selected identifier to the mobile station over a forward link control channel prior to the receiving the data, a timing of when the assignment message is sent establishing when the mobile station will send the data, allocate, in response to the received data alert message, reverse link resources for receiving data over a shared reverse link data channel without allocating forward link resources for forward link data transmission in association with the allocated reverse link resources, repeatedly receive at least a part of the data on the reverse link data channel based on the allocated reverse link resources until the data is successfully decoded, and send an acknowledgement of the received data on a forward link channel if the received data is successfully decoded.

6. A mobile station for using wireless resources in a wireless communication network, the mobile station comprising:

a processor configured to,
- receive available identifiers from a plurality of identifiers reserved for only a shared reverse link data channel,
- select one of the available identifiers,
- transmit a data alert message on a reverse link access channel indicating the mobile station has data for transmission, the data alert message including a selected one of the available identifiers, the selected one of the available identifiers being reserved for only the shared reverse link data channel, and in response to the transmitted data alert message, reverse link resources for receiving data over a shared reverse link data channel are allocated without an allocation of forward link resources for forward link data transmission in association with the allocated reverse link resources,
- receive an assignment message including the selected identifier over a forward link control channel, a timing of when the assignment message is sent establishing when the mobile station will send the data,
- repeatedly transmit at least a part of the data on the reverse link data channel based on allocated reverse link resources until the data is successfully decoded, and
- receive an acknowledgement of the received data on a forward link channel if the received data is successfully decoded.

\* \* \* \* \*